Dec. 20, 1955 P. D. ABBOTT 2,727,452
TRACTOR MOUNTED IMPLEMENT-SUPPORTING BAR
Filed March 19, 1952 2 Sheets-Sheet 1
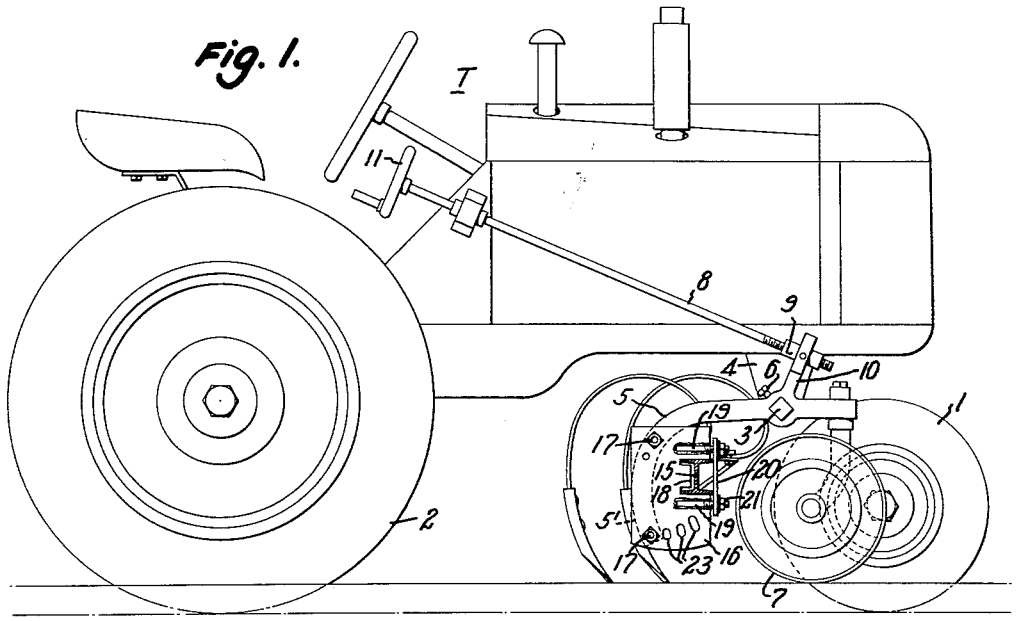
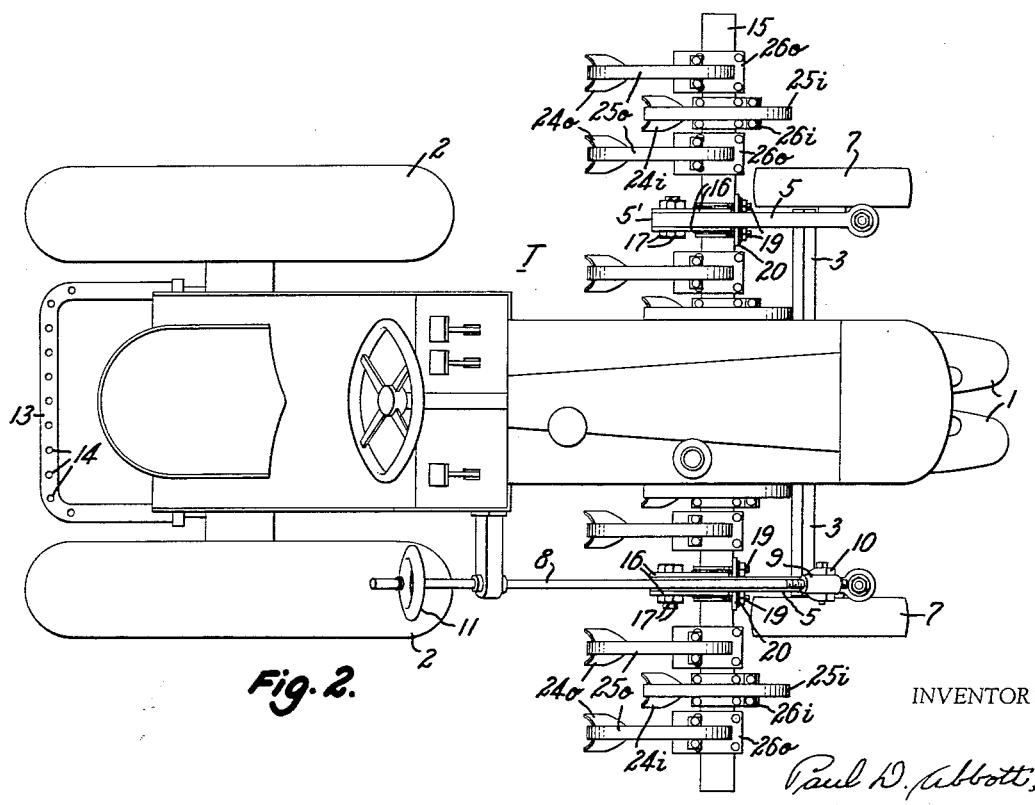
INVENTOR:
Paul D. Abbott,
BY Pierce, Scheffler & Parker,
ATTORNEYS.

Dec. 20, 1955 P. D. ABBOTT 2,727,452
TRACTOR MOUNTED IMPLEMENT-SUPPORTING BAR
Filed March 19, 1952 2 Sheets-Sheet 2
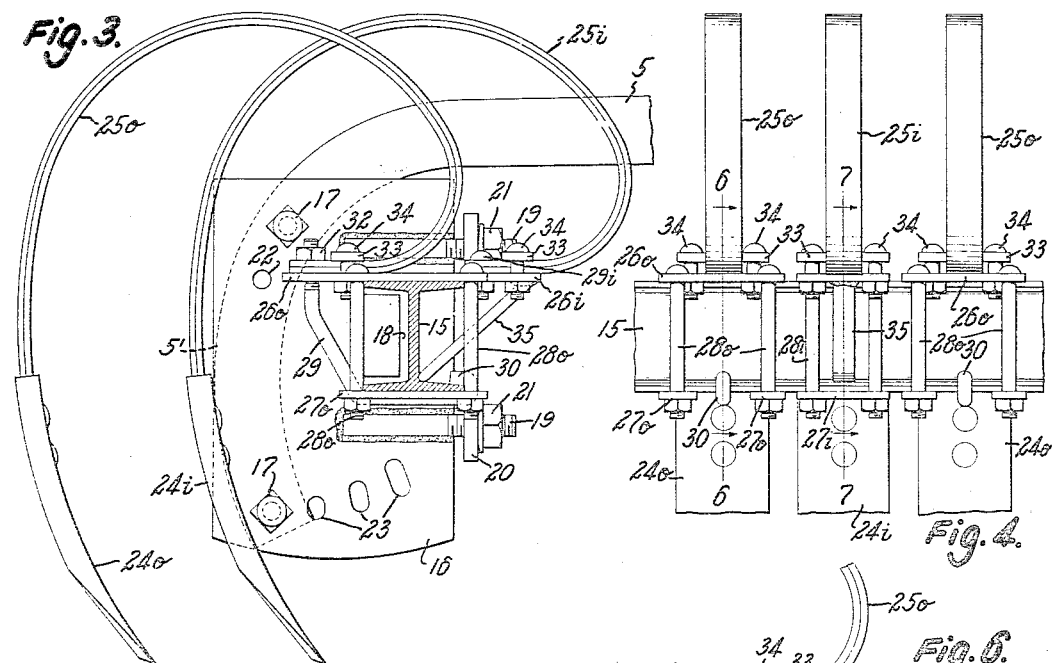
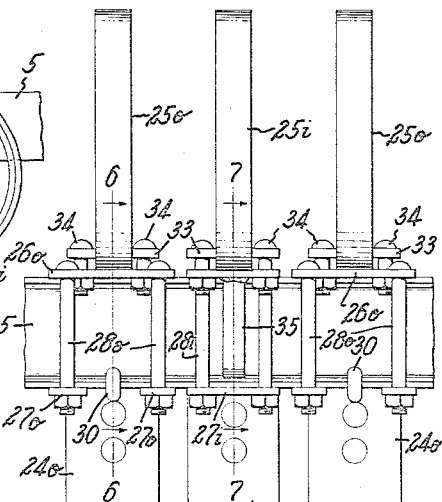
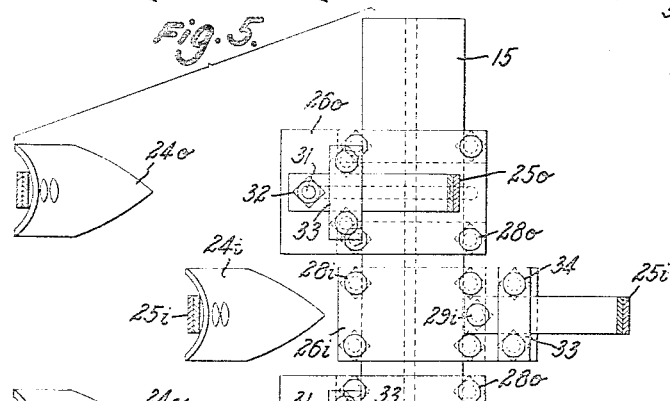
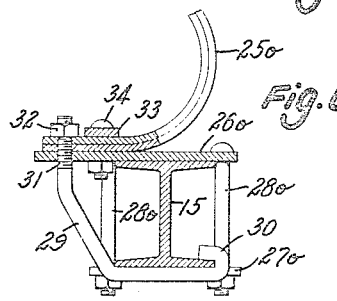
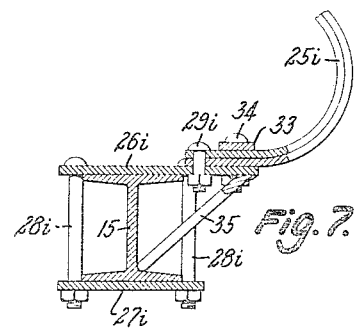
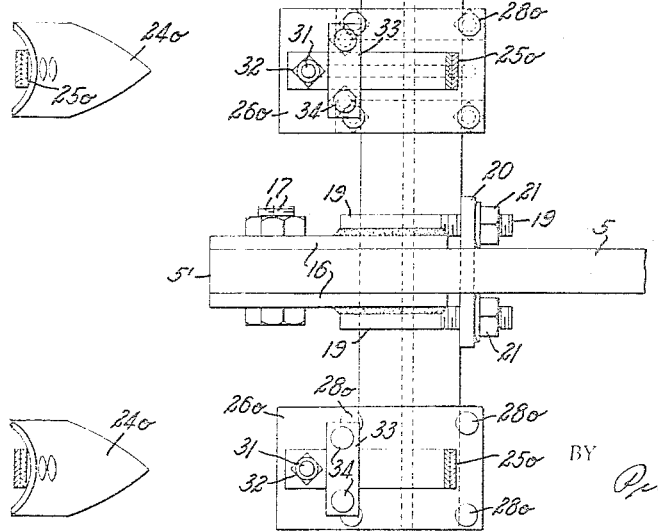
INVENTOR:
Paul D. Abbott
BY
Pierce, Scheffler & Parker
ATTORNEYS

United States Patent Office 2,727,452
Patented Dec. 20, 1955

2,727,452
TRACTOR MOUNTED IMPLEMENT-SUPPORTING BAR

Paul D. Abbott, Blytheville, Ark.

Application March 19, 1952, Serial No. 277,358

2 Claims. (Cl. 97—47.43)

This invention relates to a tractor mounted implement-supporting bar and associated implements, and more particularly to apparatus for use in the preparation of soil for seeding.

In the preparation of seed beds in heavy soil such as found along the Mississippi River in Arkansas, it is conventional practice to throw up soil ridges by plows, commonly known as bottoms or middle busters, which are adjustably mounted on tractors in front of the rear driving wheels, thus forming two furrows along which the driving wheels move and four soil ridges which are to be seed beds. The soil in the ridges is caked or lumpy and must be broken up or pulverized before seeding. The current practice is to break up the soil ridges by disk harrows drawn behind a tractor but this is open to a number of objections. In the first place, the downward component of the drag on the tractor causes a destructive and abrasive wear on the tractor tires, slippage of the driving tires, and a high rate of fuel consumption. In the event of heavy rainfall after the initial bedding, water will stand in the furrows in which the tractor driving wheels run and the ground may be so softened that the tractor bogs down completely or at best consumes an excessive amount of fuel.

Objects of the present invention are to provide a soil-preparing attachment for a tractor which will eliminate or reduce the disadvantages of the prior equipment for working up the bedding soil ridges produced by known equipment. An object is to provide an implement-supporting bar and implements mounted thereon for preparing for seeding the soil ridges formed by the initial bedding operation. A further object is to provide an implement-supporting bar which may be mounted upon the same tractor-carried elements which initially supported the bottom or buster plows, and implements in the form of chisels on spring foot pieces which are adjustable as to their positions along the bar. A further object is to provide brackets for rigidly securing groups of spring foot pieces to a mounting bar in such manner as to equalize to a considerable extent the stresses imposed upon the bar when working heavy soil.

These and other objects and the advantages of the invention will be apparent from the following specification when taken with the accompanying drawings, in which:

Figs. 1 and 2 are a side elevation and plan view, respectively, of a tractor having mounted thereon an implement-supporting bar embodying the invention;

Fig. 3 is an end elevation of the mounting brackets and implements on a larger scale; the bar being shown in transverse section;

Figs. 4 and 5 are a fragmentary front elevation and a fragmentary plan, respectively, of the supporting bar and a group of implements; and Figs. 6 and 7 are fragmentary transverse sections on lines 6—6 and 7—7, respectively, of Fig. 4.

In Figs. 1 and 2 of the drawings, the reference character T identifies a tractor having front wheels 1, rear driving wheels 2, and a shaft 3 extending transversely of the tractor adjacent the front wheels and mounted by bearings, not shown, for angular adjustment with respect to brackets 4 secured to the tractor frame. Plow beams 5 for supporting bottoms or buster plows are adjustable along and secured to the shaft 3 by screws 6, and depth gauge wheels 7 are secured to the plow beams. The shaft 3 may be adjusted angularly to raise or lower the gauge wheels by a threaded shaft 8 which extends through a correspondingly threaded sleeve 9 of an arm 10 which is secured to one of the plow beams. The adjusting shaft 8 is provided with a hand wheel 11 in convenient position for actuation by the tractor driver. The rearward and downwardly extending ends 5' of the beams are provided with two bolt holes for the attachment of buster or bottom plows to the plow beams. A draw bar or other means is provided at the rear of the tractor T for the attachment of other implements such as planters, fertilizers or lime distributors. As shown, this coupling device is a pipe or bar 13 which extends transversely of the tractor at the rear of the drive axle housing and is provided with a series of bolt holes 14.

The apparatus as so far described is schematic or typical of equipment manufactured by a number of companies according to their individual patterns and designs. The apparatus as manufactured by different tractor companies is usually more elaborate than shown in Fig. 1 and may include means for manual adjustment of the gauge wheels with respect to the plow beams, manual or hydraulic apparatus for quickly lifting the plow beams and associated implements for transport from one field to another or along the highway, hydraulic apparatus in place of the illustrated manually operated shaft 8 for adjusting the operating level of the implements, and other refinements. In some instances the transverse shaft 3 and its mountings are such that the shaft may be readily removed from the tractor for the substitution of another form of implement support or to adapt the tractor for another use. These various details are not features of the invention and have not been illustrated since the novel implement-supporting bar may be employed with any of the known tractor-carried equipment which includes plow beams 5 on which bottom listers or middle buster plows may be mounted. The implement-supporting bar is mounted on the plow beams on removal of the bottom listers or buster plows after the formation of the soil ridges or beds in which the seed is to be planted.

The implement-supporting bar 15 is a structural beam, preferably a 4″ H-beam of about 12 feet in length for a particular set of bedding conditions but the particular dimensions may be varied according to the load imposed upon the soil-preparing implements and the width of the soil band to be worked. The beam 15 is mounted upon the plow beams 5 at opposite sides of the tractor by clamping devices which each include parallel steel plates 16 having openings at their rear edges for receiving bolts 17 to clamp them to opposite sides of the rear end 5' of a plow beam and profiled recesses 18 at their front edges for receiving the H-beam 15, the depth of the recesses being such that the forward edges of the beam project beyond the front edges of the plates 16. Bolts 19 are welded to the outer faces of the plates 16 and a clamp plate 20 is drawn down upon the outer edges of the beam 15 by nuts 21 to anchor the beam 15 rigidly to the plates 16 and thereby to the beams 5.

As now manufactured by different companies, there are two "standard" spacings of the bolt holes of the plow beams 5, and the plates 16 are provided with a series of three bolt holes, of which two receive the bolts 17 and the third hole 22 is idle on any one installation, for clamping the plates 16 to plow beams of different bolt hole spacings. The plates 16 are provided with additional bolt holes 23 for securing the supporting beam 15 to the plow beams 5 in such angular relation as to present the implements mounted on the beam 15 to the soil ridges at a desired pitch or angle of attack.

The implements for pulverizing the soil ridges to complete the preparation of the seed beds are chisels or bull tongue plows on spring foot pieces; there being a group of three plows for each soil ridge, with the inner plow 24i and its spring foot 25i well in advance of the outer plows 24o and their spring foot pieces 25o to avoid clogging by weeds and trash, see Figs. 3 to 7. Each plow and its spring foot is individually mounted upon the supporting beam by a bracket which may be adjusted to and clamped at any desired point along the beam.

The brackets for the outer implements of each set comprise an upper plate 26o and two lower straps 27o which are clamped against the upper and lower faces of the supporting beam 15 by bolts 28o, see Figs. 3 to 6. The plate 26o projects rearwardly from the beam 15 to provide a seat for the spring foot 25o which comprises two leaf springs of conventional form and having alined bolt holes at their upper ends. The spring foot 25o is clamped to the plate 26o and anchored to the diagonally opposite edge of the beam 15 by a tension member 29 in the general form of a bolt having a lower hooked end 30 which fits over the forward edge of the lower web of the beam 15, and an upper threaded end 31 which passes through the plate 26o and the spring foot 25o to receive a clamp nut 32. This mounting of the spring foot upon the plate 26o is reinforced by a strap 33 which extends over the spring foot and is secured to the plate 26o by bolts 34.

The brackets for mounting the inner implement of each group upon the supporting beam 15 each comprises an upper plate 26i and a lower plate 27i of generally rectangular form and clamped to the beam 15 by bolts 28i, see Figs. 4, 5 and 7. Each spring foot 25i, which is or may be identical with the spring foot pieces 25o, is secured to the forwardly projecting end of its mounting plate 26i by a bolt 29i and a strap 33 which is secured to the mounting plate by bolts 34. A compression strut or narrow plate 35 is welded to the outer under edge of the plate 26i, the strut being inclined downwardly and rearwardly at such an angle that its lower end seats against the junction of the web and lower outer flange of the H-beam 15.

The tension member 29 of the outer implement mountings and the compression strut 35 of the inner implement mountings are important features of the invention as they afford an efficient transfer of the stresses imposed upon the chisels 24i and 24o to the supporting beam 15. If the tension members 29 and compression struts 35 were omitted, it would be necessary to provide heavier mounting brackets and a heavier H-beam 15 to resist the heavy stresses imposed upon the implements in breaking up and pulverizing the clods of the soil ridges thrown up by the buster plows. It is to be noted that the clamping bolts 28i and 28o are located in front of and at the rear of the beam 15, thus avoiding a weakening of the beam flanges by a series of bolt holes.

The method of use and some of the advantages of the implement-supporting beam are obvious. The location of the implements in full view of the tractor operator is of course preferable to the prior practice of drawing the soil-preparing implements back of the tractor. Other implements such as seeders, liming or fertilizer equipment may be drawn behind the tractor when the implements for completing the preparation of the seed beds are in front of the driving wheels of the tractor. Other advantages of the invention over the prior practice of pulverizing the soil ridges by implements such as disc harrows drawn by a tractor are not so apparent. For example, in the event of rain after the initial breaking of the soil, a common problem is soft or wet spots, or frequently mud holes in the furrows along which the driving wheels travel. With implements drawn by the tractor, there is a downward component of drawbar pull which increases the tendency of both the tractor and the implements to sink into the hole. With the beam and implements of the invention, the operator can raise the beam gradually as the tractor approaches a mud hole, and soil from the ridges will be pushed into the mud hole to provide a firmer support for the tractor wheels.

While apparatus according to the invention has been described with reference to the final preparation of seed beds, it is apparent that it is useful for other purposes such as, for example, the cultivation of growing crops. The implements on the supporting bar may be so spaced as to cultivate and weed between rows of plants so long as the plants are of such height that they will not be damaged by the beam 15. It is to be noted that while apparatus according to the invention is of utility as a cultivator for low-growing crops, the conventional cultivator equipment is of relatively weak construction and can not be employed to break up or pulverize the soil ridges thrown up by middle buster plows. For planting on the level, without first forming parallel rows of raised seed beds, additional brackets may be mounted upon the beam to form a more or less continuous series of uniformly spaced plows, and the soil may be pulverized and leveled by a single travel over the field by pulling a chain harrow behind the tractor. By substituting flat heel sweep implements for chisel plows on the supporting bar, and setting the bar 15 at an appropriate angle by selection of one set of the bolt holes 23, the apparatus may be employed for cross plowing row crops for thinning.

It is to be understood that the invention is not limited to the particular apparatus herein shown and described as various modifications which may occur to those skilled in the art fall within the spirit and scope of the invention as set forth in the following claims.

I claim:

1. An agricultural implement comprising the combination with a tractor having rear driving wheels, a pair of plow beams symmetrically arranged at opposite sides of the tractor in front of the respective driving wheels, a depth gauge wheel for each plow beam, manually actuated means for raising and lowering the rear ends of said plow beams, said rear ends being turned downward and provided with bolt holes; of an implement-supporting beam of H shape in cross-section, clamp plates bolted to said ends of the plow beams and recessed at their forward edges to provide seats for the flanges of the H-beam, and means for securing said beam to said clamp plates; said securing means comprising sets of bolts welded to said clamp plates and a further plate drawn down upon the outer edge of said H-beam by each set of bolts to secure said H-beam in said seats.

2. An agricultural implement comprising the combination with a tractor, a plow beam secured to said tractor, a depth gauge wheel for said plow beam, and means for raising and lowering the rear end of said plow beam, said rear end being turned downward and provided with bolt holes; of an implement-supporting beam of H-shape in cross section, clamp plates bolted to said end of said plow beam and recessed at their forward edges to provide seats for the flanges of the H-beam, and means for securing said beam to said clamp plates, said securing means comprising sets of bolts welded to said clamp plates and a further plate drawn down upon the outer edge of said H-beam by each set of bolts to secure said H-beam in said seats.

References Cited in the file of this patent

UNITED STATES PATENTS

| Number | Name | Date |
|---|---|---|
| 1,593,258 | Haworth | July 20, 1926 |
| 1,981,228 | Ganaway | Nov. 20, 1934 |
| 2,172,985 | Morkoski | Sept. 12, 1939 |
| 2,294,205 | Rau | Aug. 25, 1942 |
| 2,327,937 | Smith | Aug. 24, 1943 |
| 2,464,225 | Graham | Mar. 15, 1949 |
| 2,491,153 | Blaydes et al. | Dec. 13, 1949 |
| 2,595,352 | Graham | May 6, 1952 |
| 2,632,372 | Williams | Mar. 24, 1953 |